Figure 1:
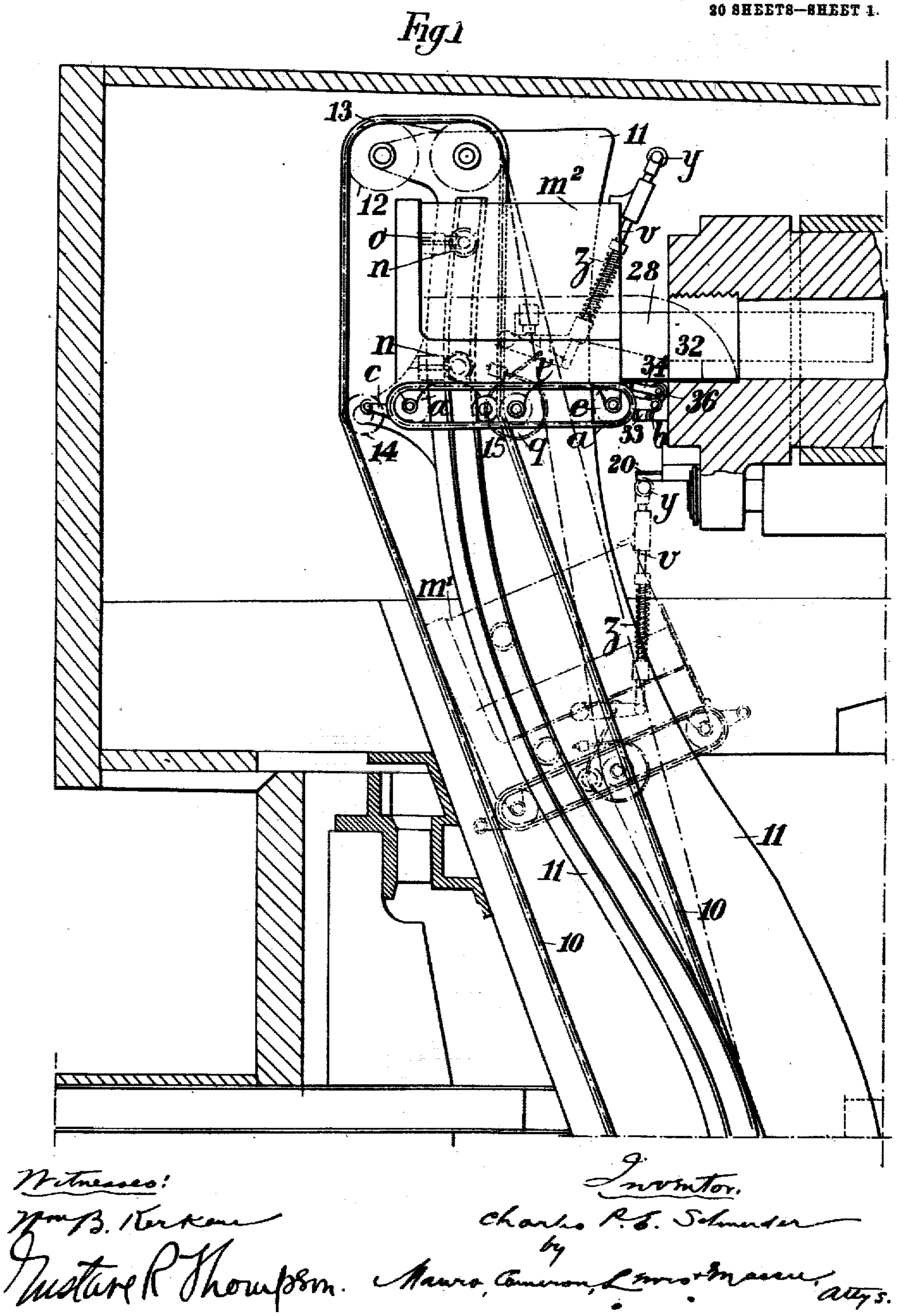

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 1.

Witnesses:

Wm B. Kerkam

Gustave R Thompson.

Inventor.

Charles P. E. Schneider by Mauro, Cameron, Lewis & Massie, attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 2.

Witnesses,

Alex Scott

Francis E. Alden

Inventor,

Charles P. E. Schneider by Mauro, Cameron, Lewis & Massie

Attys

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 3.

Witnesses,

Alex Scott

Francis E. Alden

Inventor:

Charles P. E. Schneider by

Mauro, Cameron, Lewis & Massie

Attys

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 4.

Witnesses,

Alex Scott

Francis E. Alden

Inventor,

Charles P. E. Schneider by Mauro, Cameron, Lewis & Massie

Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 5.

Witnesses,
Alex Scott
Francis E. Alden

Inventor,
Charles P. E. Schneider
by
Mauro, Cameron, Lewis & Massie
Attys

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 6.

Witnesses:

Wm B. Kerkam

Gustave R. Thompson

Inventor:

Charles P. E. Schneider by

Mauro, Cameron, Lewis & Massie,

Attys.

No. 811,797.

PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 7.

Witnesses:
Wm B. Kerkam
Gustave R. Thompson.

Inventor:
Charles P. E. Schneider,
by
Mauro, Cameron, Lewis & Massie
Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 8.

Witnesses,

Alex Scott

Francis E. Alden

Inventor:

Charles P. E. Schneider by

Mauro, Cameron, Lewis & Massie

Attys

No. 811,797.

PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 9.

Witnesses,

Alex. Scott

Francis E. Alden

Inventor,

Charles P. E. Schneider by

Mauro, Cameron, Lewis & Massie

Attys

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 10.

Witnesses:
Wm. B. Kerkam
Gustave R. Thompson.

Inventor:
Charles P. E. Schneider,
by
Mauro, Cameron, Lewis & Massie, Attys.

No. 811,797.

PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 11

Witnesses:
Wm B. Nerkam
Gustave R. Thompson

Inventor:
Charles P. E. Schneider,
by Mauro, Cameron, Lewis & Massie,
Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 12.

Witnesses:
Wm B. Kerkam
Gustave R. Thompson.

Inventor:
Charles P. E. Schneider,
by Mauro, Cameron, Lewis & Massie.
Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 13.

Witnesses:
Wm B. Kerkam
Gustave R. Thompson

Inventor:
Charles P. E. Schneider,
by Mauro, Cameron, Lewis & Massie, Atty.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 14.

Witnesses:
Wm B. Kerkam.
Gustave R. Thompson.

Inventor:
Charles P. E. Schneider,
by Munro, Cameron, Lewis & Massie,
Attys.

No. 811,797. PATENTED FEB. 6, 1906.

C. P. E. SCHNEIDER

APPARATUS FOR LOADING GUNS IN TURRETS, &c.

APPLICATION FILED OCT. 5, 1904.

20 SHEETS—SHEET 15.

Witnesses:

Wm B. Kerkam

Gustave R. Thompson.

Inventor,

Charles P. E. Schneider, by

Mauro, Cameron, Lewis & Massie

Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 16.

Witnesses,

Alex Scott

Francis E. Alden

Inventor

Charles P. E. Schneider by

Mauro, Cameron, Lewis & Massie

Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 17.

Witnesses:
Wm B. Kerkam
Gustave R. Thompson.

Inventor
Charles P. E. Schneider,
by
Mauro, Cameron, Lewis & Massie
Attys

No. 811,797.

PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 18.

Witnesses:

Wm B. Kerkam

Gustave R. Thompson

Inventor:

Charles P. E. Schneider, by Munro, Cameron, Lewis & Massie, Attys.

No. 811,797. PATENTED FEB. 6, 1906.

C. P. E. SCHNEIDER.

APPARATUS FOR LOADING GUNS IN TURRETS, &c.

APPLICATION FILED OCT. 5, 1904.

20 SHEETS—SHEET 19.

Witnesses:
Wm B. Kerkam
Gustave R. Thompson.

Inventor:
Charles P. E. Schneider,
by
Mauro, Cameron, Lewis & Massie,
Attys.

C. P. E. SCHNEIDER.

APPARATUS FOR LOADING GUNS IN TURRETS, &c.

APPLICATION FILED OCT. 5, 1904.

Witnesses:
Wm B. Kirkam
Gustave R. Thompson

Inventor:
Charles P. E. Schneider,
by
Mauro, Cameron, Lewis & Massie. Attys.

UNITED STATES PATENT OFFICE.

CHARLES PROSPER EUGÈNE SCHNEIDER, OF LE CREUSOT, FRANCE.

APPARATUS FOR LOADING GUNS IN TURRETS, &c.

No. 811,797. Specification of Letters Patent. Patented Feb. 6, 1906.

Application filed October 5, 1904. Serial No. 227,293.

*To all whom it may concern:*

Be it known that I, Charles Prosper Eugène Schneider, of Le Creusot, Saône-et-Loire, France, have invented a new and useful Improvement Relating to Apparatus for Loading Guns in Turrets or the Like, which is fully set forth in the following specification.

For loading guns in turrets other than those that are loaded with fixed ammunition—that is to say, with cartridges which contain the full charge of powder and the projectile in a rigid case—it is usual to employ rammers for loading or charging the gun, these rammers being arranged and operated independently of the hoist or other apparatus for supplying the ammunition to the loading position and having been always operated in a special manner either by hand or otherwise.

This invention relates to an arrangement which permits of operating by means of one and the same driving apparatus the ammunition-hoist and the ramming mechanism mounted upon the same.

The novel arrangement comprises an ammunition-cage provided not only with the rammer, but also with actuating mechanism for the latter, which is operated by the same part that serves to raise and lower the cage.

The accompanying drawings show, by way of example, various constructional forms by means of which the said invention may be carried into practice, one form being represented in Figures 1 to 13.

Figure 2:
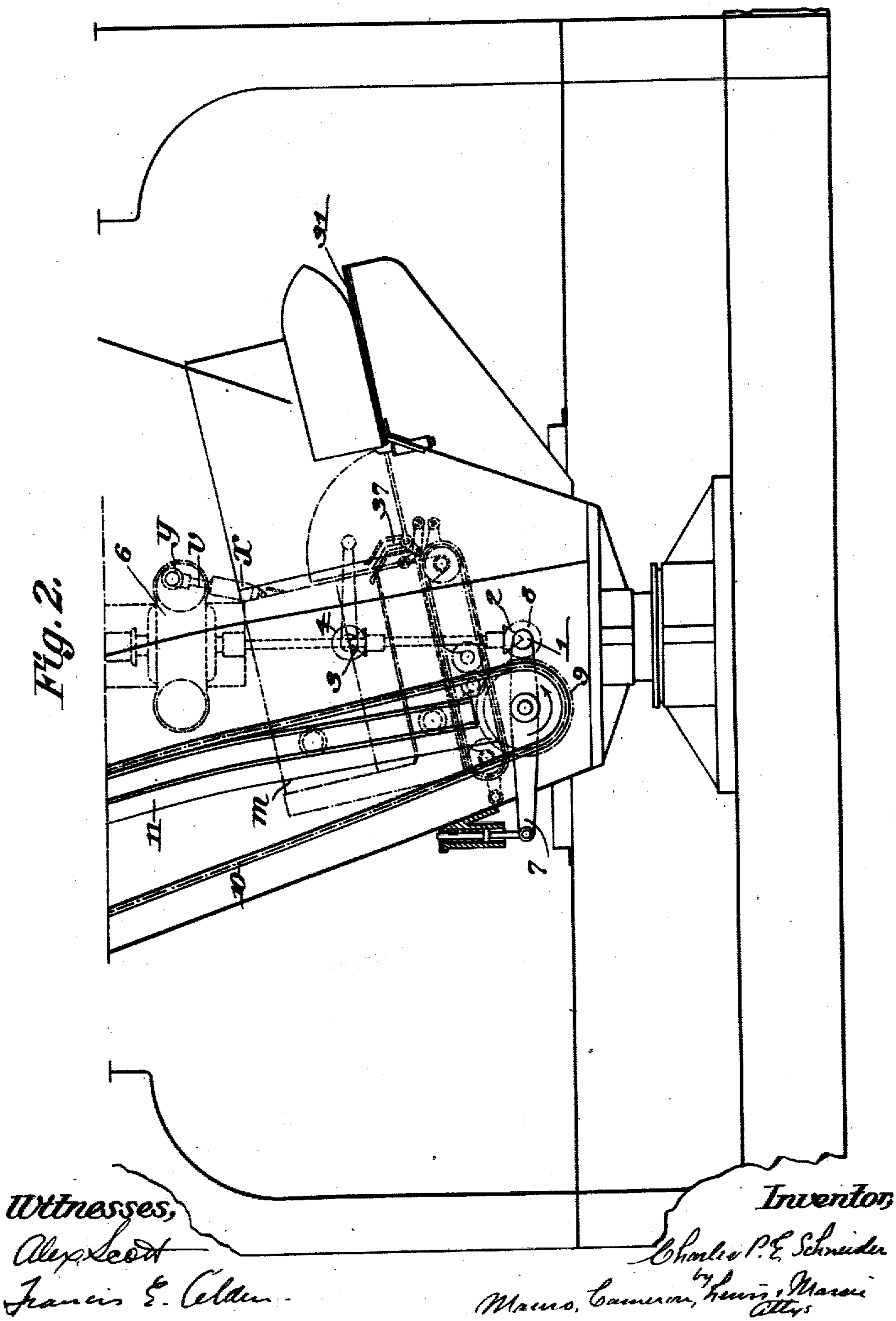
Figure 3:
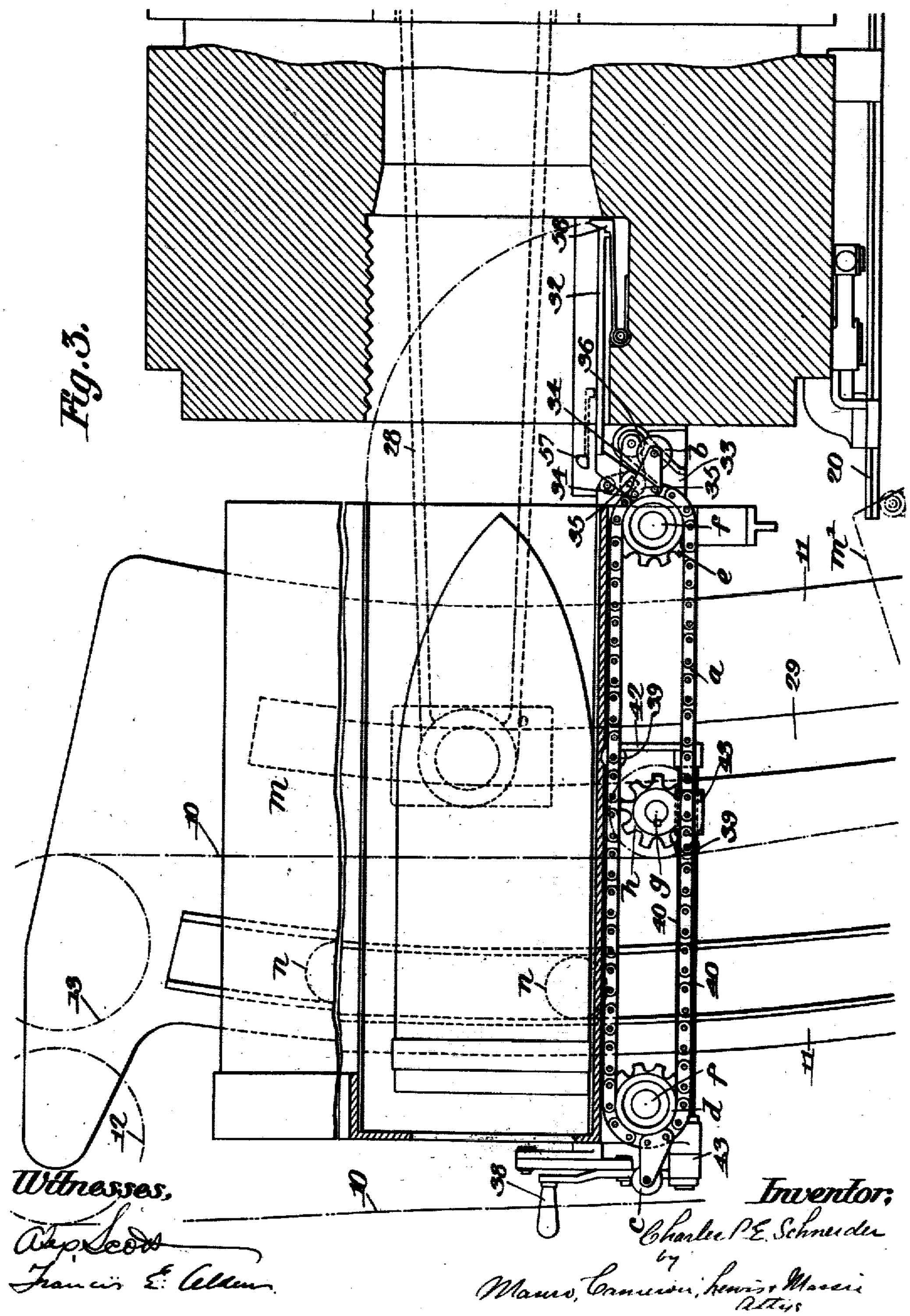
Figure 4:
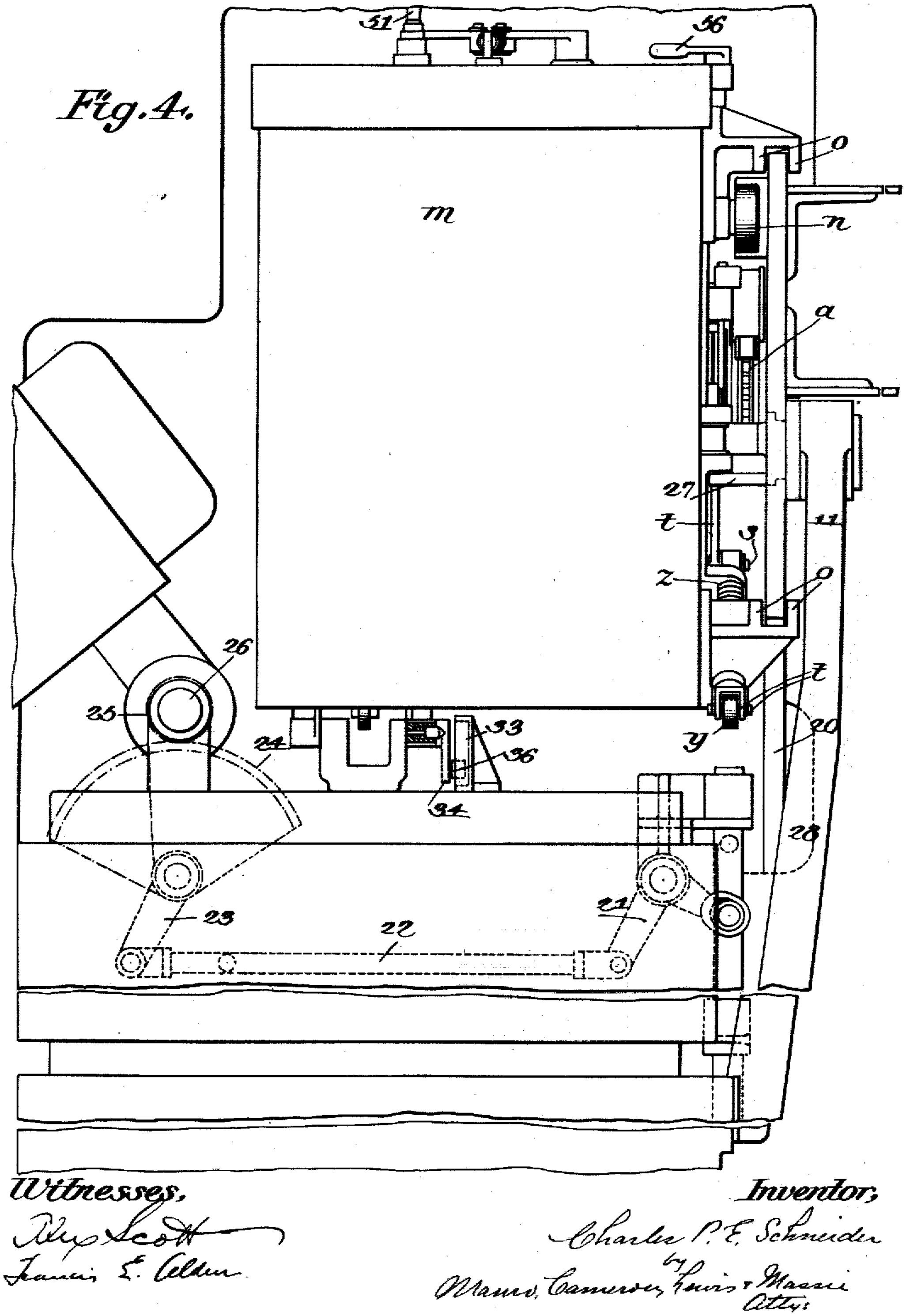
Figure 5:
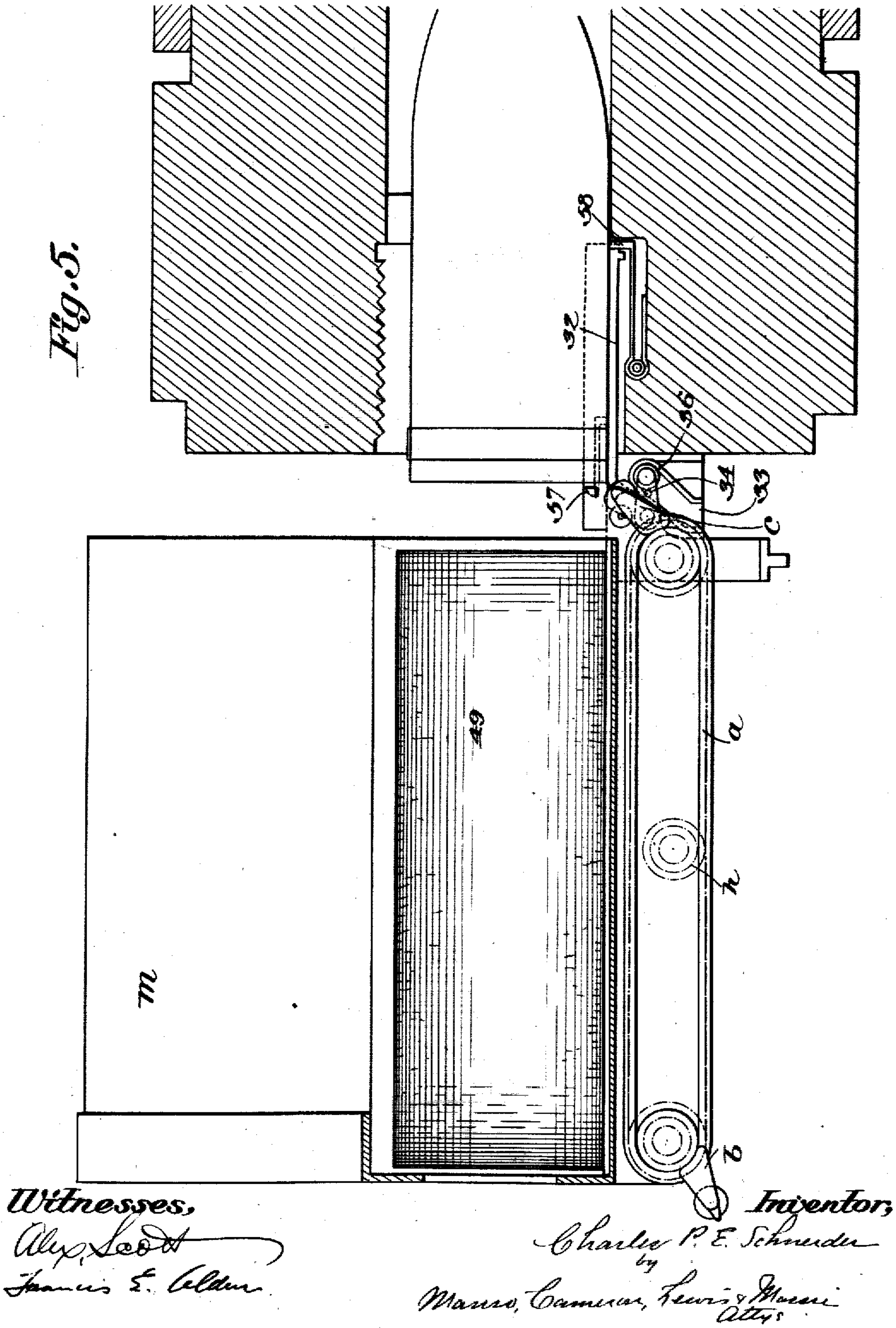
Figure 6:
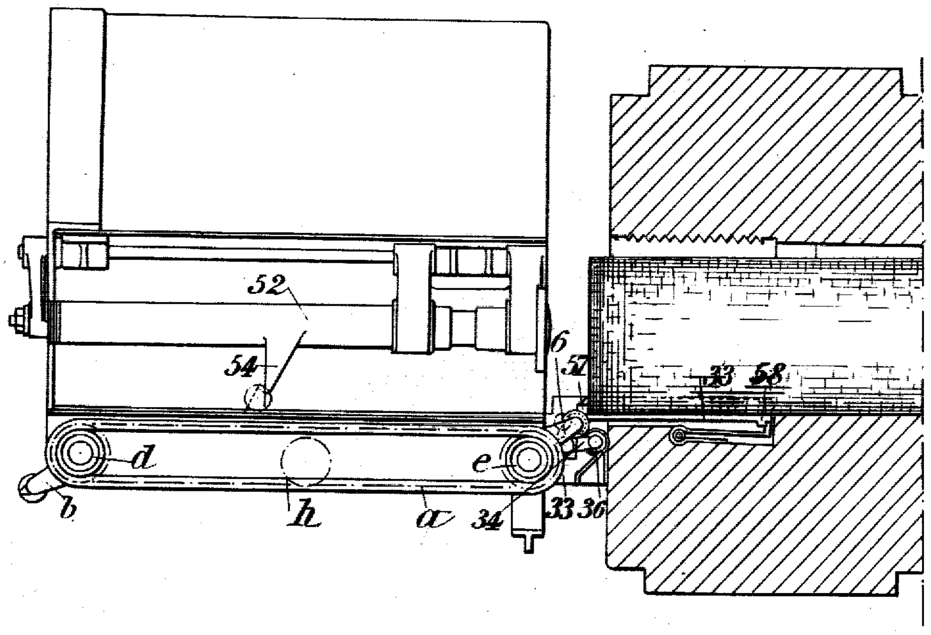
Figure 7:
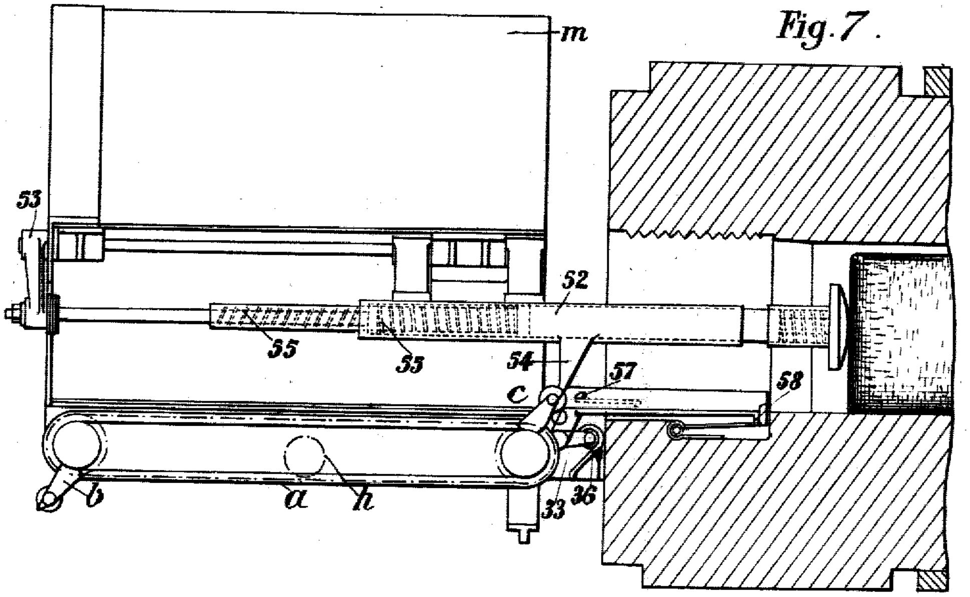
Figures 8, 12:
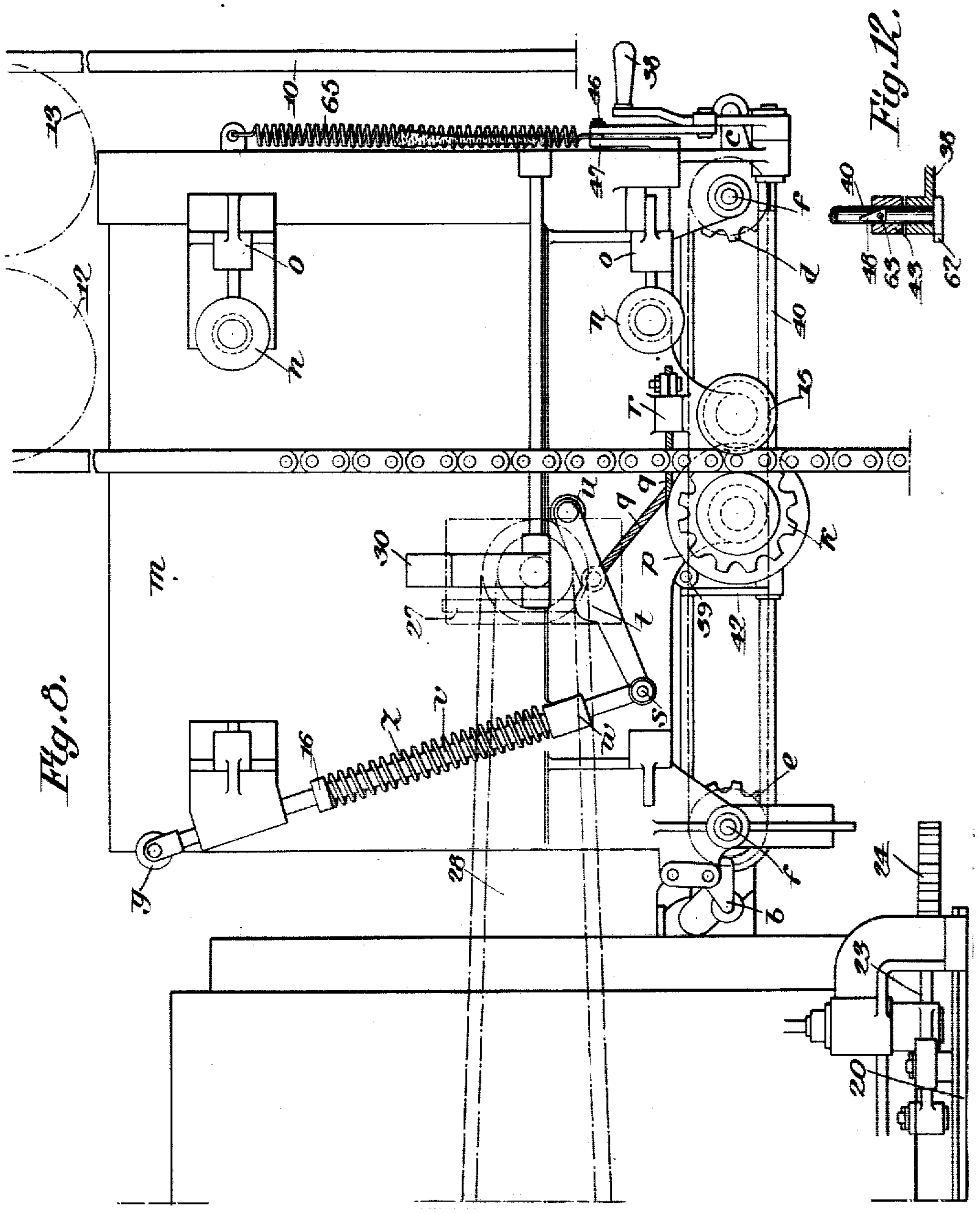
Figure 9:
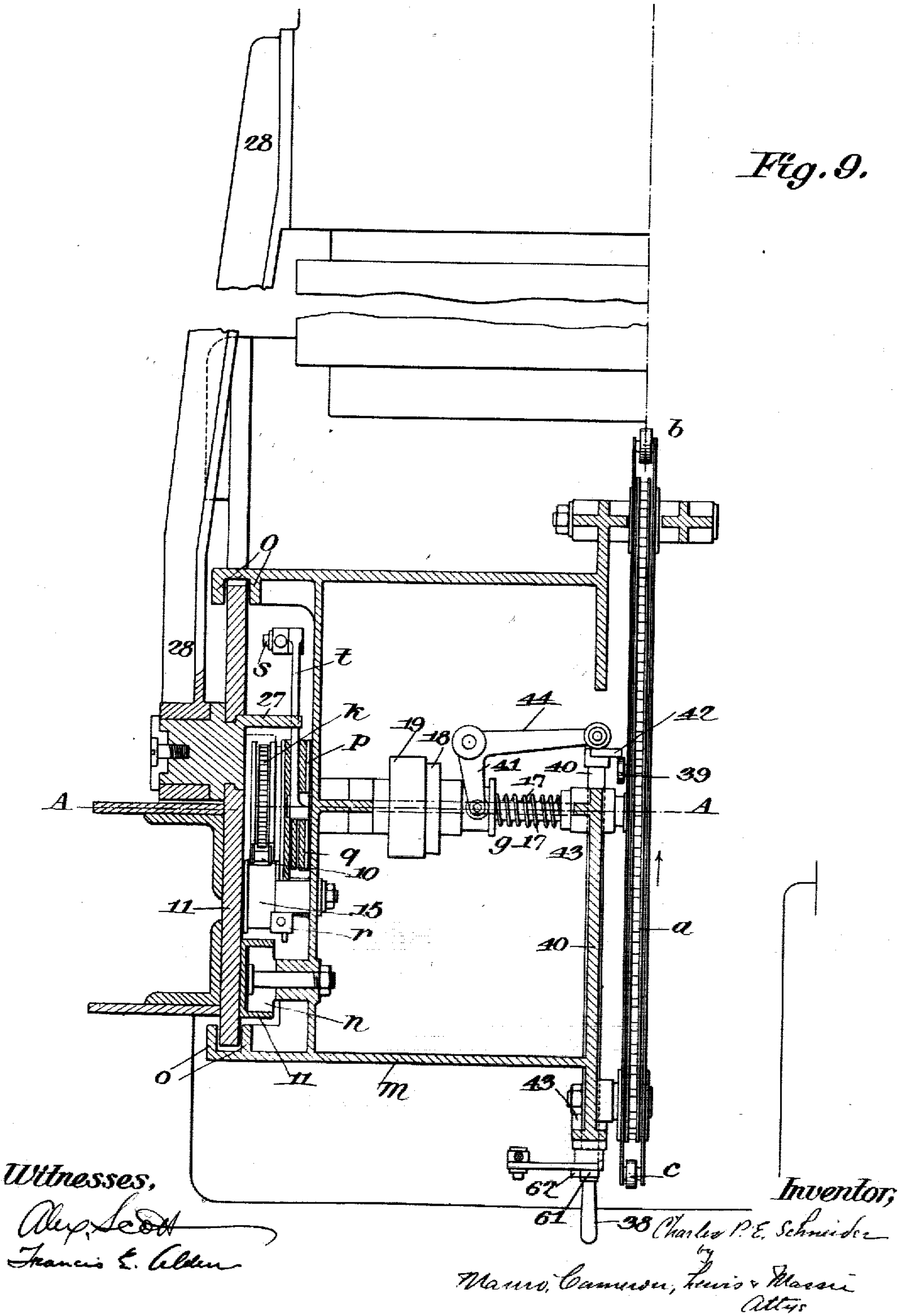
Figure 10:
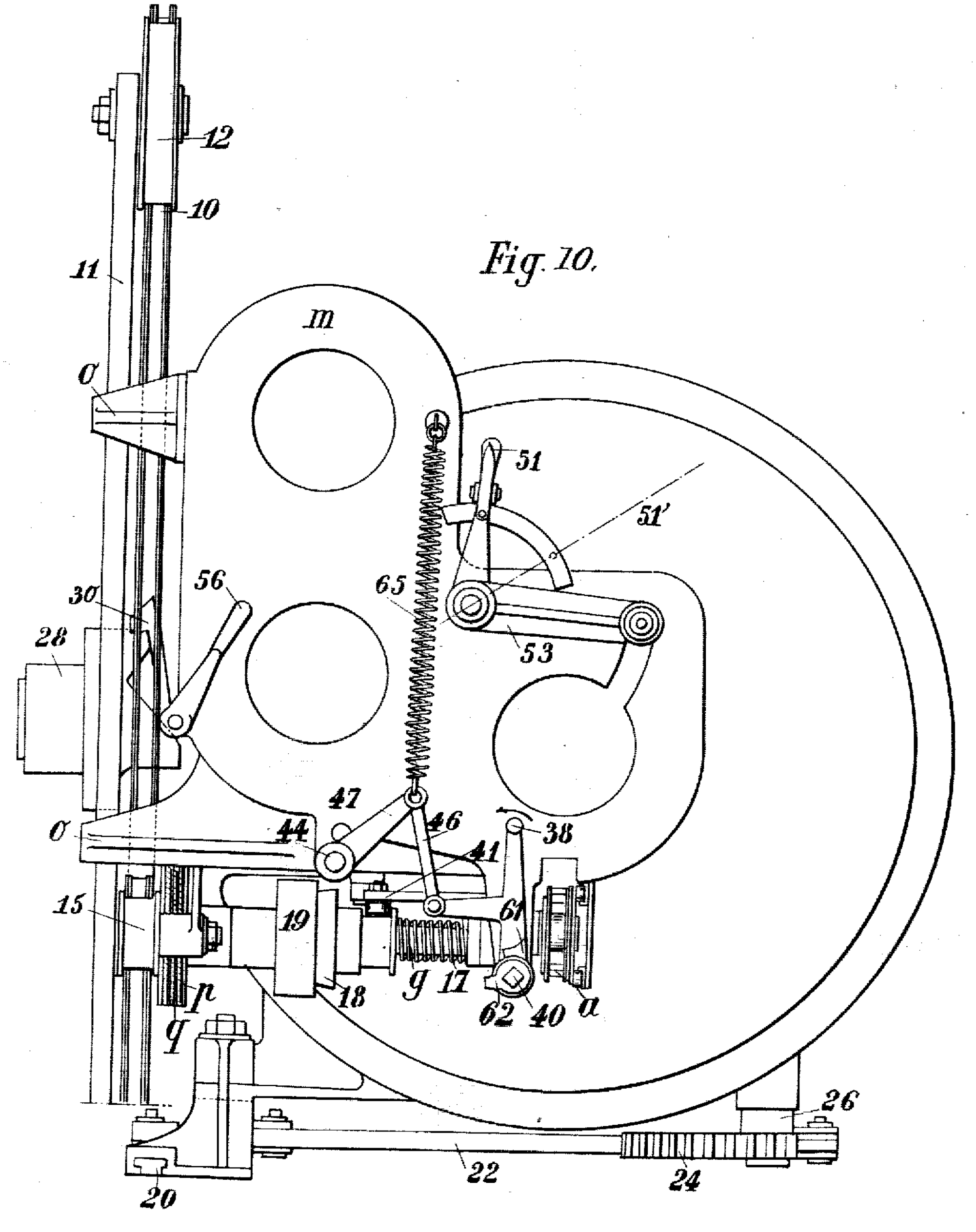
Figures 11, 13:
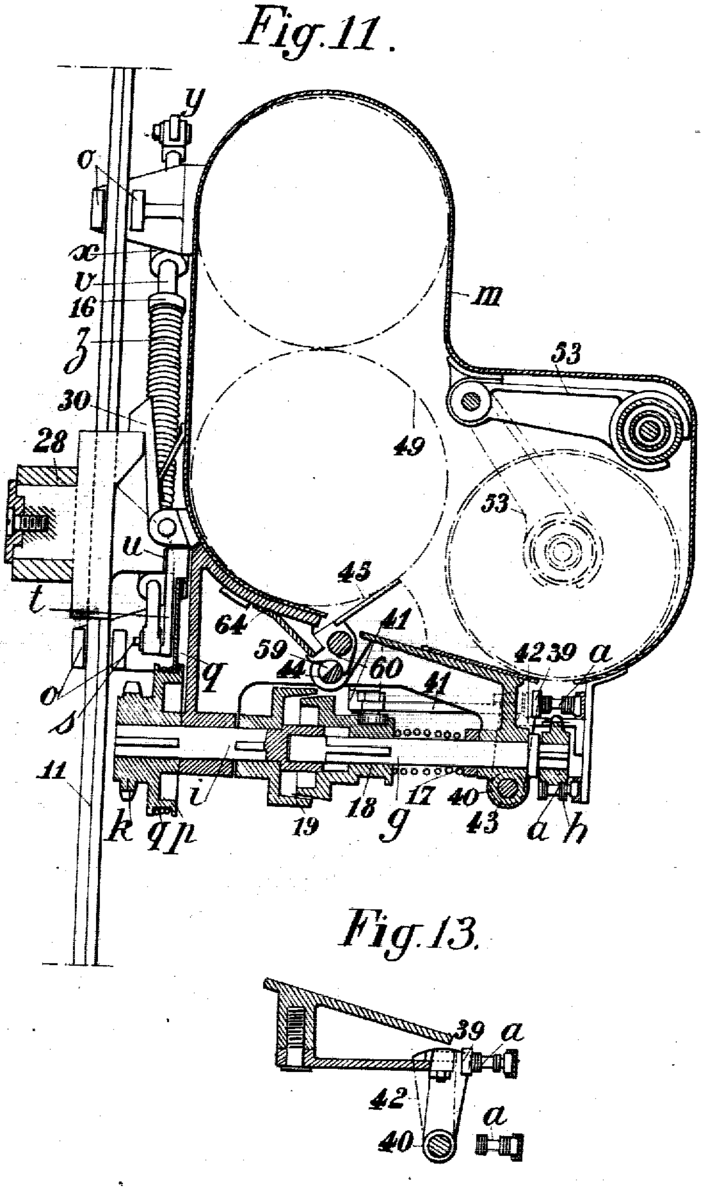

Figs. 1 and 2 are sectional elevations showing the ammunition hoist or elevator combined with the loading or charging appliance in a turret. The "ammunition-hoist," properly so called—that is to say, the cage which carries the loading or charging apparatus—is drawn in full lines in the position that it occupies relatively to the gun for charging, two other positions being indicated in broken lines. Fig. 3 shows, partly in section on an enlarged scale, the cage and the charging apparatus ready for inserting the projectile. Fig. 4 is a plan showing the connection of the said apparatus with the breech-opening mechanism. Fig. 5 is a partial sectional elevation showing the projectile and the first cartridge or powder charge in place ready to be pushed by the charging apparatus, and thereby to push the projectile forward. Fig. 6 is a sectional elevation showing the projectile and the two powder charges introduced into the barrel and the ramming extension-piece carried by the cage ready to operate to bring the charge into position. Fig. 7 is a sectional elevation showing the parts after the operation of the ramming extension-piece. Fig. 8 is a side elevation showing the cage and the charging apparatus. Fig. 9 is a sectional plan showing the members for connecting the charging apparatus, the cage raising and lowering mechanism, and the gun. Fig. 10 is an end elevation of the parts shown in Fig. 9. Fig. 11 is a sectional elevation on the line A A of Fig. 9. Figs. 12 and 13 show detail of the same.

In the present instance the guide-support for the loading or charging apparatus or mechanism is constituted by the cage *m*, which receives the ammunition at the base of the turret. This loading or charging mechanism, as shown in Fig. 3, comprises an endless chain *a*, carrying pushers *b c* and mounted upon chain-wheels *d e*, which are keyed upon shafts *f*, carried by the cage. The latter also carries a shaft *g*, upon which is keyed a driving-wheel *h* for the endless chain carrying the pushers.

For making the connection between this mechanism and the ammunition and for insuring the operation of the whole by means of a single device, such as a mechanical motor or hand-crank, the shaft carried by the cage is divided into two parts *g* and *i*, Fig. 11, connected by clutch mechanism. The part *g* carries the operating mechanism for the driving member *h* of the charging apparatus, while upon the part *i* is keyed a toothed wheel *k*, constantly in engagement with the endless chain 10, which serves to raise the cage *m*. It will be understood that if the length or part *i* is locked in the cage while the latter is free it will only be necessary to displace the chain 10 to lift the cage and the charging appliance carried thereby. If, on the other hand, the cage is stopped by slackening the friction device *q*, it will be necessary to engage the part *i* with the part *g* of the shaft in order that a movement of the chain 10 may effect the rotation of the wheel *h* and the operation of the charging apparatus.

As will hereinafter be seen, this invention comprises a braking device which is normally kept applied and locks the wheel *k* for the movement of ascent and descent of the cage, but which is automatically released for the actuation of the charging apparatus. It also comprises a device for automatically actuating the clutch between the two lengths or parts of the shaft *g i*.

In the lower part of Fig. 2 it will be seen that upon a fixed part is mounted a shaft 1, which by the agency of transmission-gear 2 3 4 (indicated diagrammatically) receives its movement from a crank 5 or from a motor 6, for example. Upon the shaft 1 are mounted a pinion 8 and a stretching-lever 7, this latter carrying a toothed wheel meshing with the pinion 8 and driving the wheel 9, which meshes with the endless chain 10. A fixed support 11 carries at its upper part two pulleys 12 and 13, upon which the chain 10 is suspended. The same support 11 carries a guide-pulley 14 for the rear length of the chain, which thus frees the passage of the cage *m*. The front length of the chain 10 is maintained by a guide-roller 15, carried by the cage itself in engagement with the wheel *k*, keyed upon the part or length *i* of shaft *g i*. The cage in which the chain 10 is thus constantly engaged carries laterally-arranged rollers *n*, guided in the fixed support 11, and guide-flanges *o*, which embrace the edges of this support, Figs. 4, 9, and 11. The driving of the cage *m* for its movements of ascent and descent is effected by the agency of the pinion *k*, which is locked for this purpose in the cage by means of a braking device. In the example represented the pinion *k* forms one with the drum *p*, upon which is wound the cable of a friction-brake *q*. The cable *q* is by one of its extremities attached to a fixed point *r* of the cage and by the other to a lever *t*, Fig. 8. This latter is pivoted by one of its extremities at a fixed point *u* of the cage and articulated by the other extremity *s* to a rod *v*, working in two guides *x w*, fixed to the cage. The rod *v* has at its free extremity a roller *y*. A spiral spring *z*, wound around the rod, bears on the one hand upon the guide *w* and on the other hand upon a collar 16, fixed on the said rod. This spring therefore constantly tends to lift the rod, and consequently to press the brake *q* upon the drum *p*.

A spring 17, arranged around the length of shaft *g*, constantly tends to maintain the engagement between the lengths *g* and *i*, which respectively carry the sleeves 18 and 19 of the clutch.

Assuming the cage *m* to be situated at the lower part of the turret, the roller *y* being free and the spring *z* consequently extended, the brake *q* is applied and the wheel *k* is locked in the cage. The starting in the desired direction of the motor 6 or of the crank 5 will cause the wheel 9 to rotate in the direction indicated by the arrow, Fig. 2. The chain 10 being in engagement with the teeth of the wheel *k* in the cage will raise this latter until it reaches the position *m'*, where the roller *y* strikes against a stop 20, rigid with the breech mechanism.

The part 20, as shown clearly in Fig. 4, is connected by a double lever 21 21, a connecting-rod 22, and a sector-lever 23 24 to a pinion 25, keyed upon the shaft of the hinge 26 of the breech. Obviously the roller *y* only strikes against the part 20 when the breech is closed. This device constitutes a safety appliance which insures the stoppage of the cage at *m'* and prevents its coming behind the gun if the breech is not open.

When owing to the opening of the breech the cage is able to pass beyond the position *m'*, it is brought to rest behind the gun by a finger 27, Figs. 4 and 9, which is carried by a guide-arm 28, solid with the cradle of the gun, and which acts upon the lever *t* to effect the release of the brake *q*. The arm 28 may be guided in the support 11, which for this purpose carries a slideway 29, Fig. 3, where the extremity of the arm is able to describe the arc of a circle having its center upon the axis of the trunnions of the cradle. The finger 27 therefore follows all the inclinations of the gun and whatever may be the position of the latter is ready to bear upon the lever *t* when the cage reaches the desired position $m^2$ for loading. In this position the cage, which is provided with a hook 30, Fig. 10, is maintained by this hook, which suspends it from the arm 28.

It will be understood that the cage brought to rest in the intermediate position *m'* by the friction of the brake will be able to descend as soon as the pressure is released if the rear of the gun becomes depressed or to rise immediately, owing to the tightening of the brake by the action of the spring *z*, if the part 20 moves aside or if the rear of the gun rises.

The ammunition prepared in advance upon a waiting tray 31 (see lower part of Fig. 2) is speedily introduced into the cage, which is then raised by the means indicated. When it comes behind the gun at $m^2$, a loading-plate 32, mounted in front of the projectile-compartment of the cage, falls automatically into the barrel. The descent of this plate and also its ascent are effected by the combined operation of a cam 33, fixed to the rear of gun, and of a double lever 34 34, keyed upon the hinge 35 of the plate and provided with a roller 36, engaging in the said cam 33. A similar movement takes place at the lower part of the turret, where a second analogous cam 37 is fixed to the waiting tray 31 for the ammunition.

When the cage automatically stops at $m^2$ behind the gun, the drum *p* becomes free and rotates, as does also the driving-wheel *k* and the brake-sleeve 19, Fig. 11, keyed upon the shaft *i*. A server then acts upon the hand-lever 38 in the direction indicated by the arrow, Fig. 10, in order to effect the engagement of the clutch-sleeves 18 and 19, which are maintained out of engagement owing to the striking of one of the symmetrical tappets 39 of the chain *a* against a finger 42, keyed upon a rod 40, sliding in guides 43, carried by the cage. The rotation of the lever 38 releases the finger 42 from the tappet 39 and permits the rod 40 to slide from left to right, Fig. 9, under the action of the lever 41, which is itself pressed by the clutch-spring 17. The sleeve 18 then rotates in driving the part $h$, which sets in motion the pusher-chain $a$, which at last has a continuous movement derived from the movement of the main chain—*i. e.*, the chain 10 of the ammunition.

The projectile previously in place in the cage is then forced into the charge-chamber by the action of the pusher $b$ or $c$. The pusher and the chain $a$ automatically come to rest when the second tappet 39 of the chain encounters the finger 42, Figs. 9, 11, and 12, and releases the clutch-sleeve 18 by the agency of the double lever 41. By again acting upon the hand-lever 38 the server produces the depression of the pallet 45 for lowering the cartridge, Fig. 11, by the agency of the connecting-rod 46 and of the lever 47. To this end the shaft 44 of the lever 47, Figs. 10 and 11, is provided with a recess 59, which in rotating releases the nose 60 of the pallet and permits this latter to move aside under the weight of the first cartridge. This cartridge is then able to assume the position which was previously occupied by the projectile. The lever 38 being still in action, a nose 61 thereon encounters a cam 62, Figs. 10 and 12, keyed upon the rod 40. This latter rotates and releases the finger 42 of the tappet 39 of the chain. The rod 40 slides from left to right. At the same time by reason of the cam 48, Figs. 12, which works on a pin 63, fixed in the guide 43, the said rod turns about its axis so as to bring back the finger 42 into the path of the tappet 39.

Immediately after the cartridge 49 has descended the pallet 45 rises under the action of a spring 64 and the lever 38 being released resumes its initial position under the influence of a spring 65, Fig. 10. The cartridge 49 having thus replaced the projectile in its compartment, Fig. 5, is forced into the barrel by the second lever $b$ or $c$ of the chain. Then occurs a fresh stoppage of this chain in the same conditions as before, then the descent of another cartridge and the forcing forward of the latter, which pushes in front of it the projectile and the first cartridge, Fig. 6. The automatic stoppage again takes place as before, the rear of the last cartridge coming flush with the face of the breech of the gun, the entire charge having then to be brought into its position in the chamber. To this end the server unhooks the hand-lever 51, Fig. 10, which he brings into the position 51′. This movement causes the depression of the lever 53 into the position 53′, Fig. 11, and the descent into the lower compartment of the cage of the ramming extension-piece 52, Figs. 11, 6, and 7. The endless chain $a$ is then again set in motion and one of its pushers $b$ or $c$ acts on a small arm 54 of the extension-piece, Fig. 6. The latter enters the barrel, ramming the ammunition home, Fig. 7. At this moment the pusher leaves the arm 54 and under the action of a spring or springs 55 the extension-piece immediately withdraws from the bore, being returned to the waiting position by means of the lever 51. The automatic stoppage of the chain $a$ takes place. The cage is then returned to the lower part of the turret, for which purpose the cage is unhooked by means of the lever 56, which causes the hook 30, Fig. 10, to turn about its pivot while the motor 6 or the crank 5 is caused to turn in the reverse direction. As soon as the cage has released the rear of the gun the breech is closed and firing may take place.

Owing to the inclination given to the gun, the projectile or the powder-cartridges might move backward therein. In order to obviate this defect, an automatic latch 57, Figs. 5 and 6, arranged at the breech, retains all parts of the ammunition which have passed the same. A second and similar latch 58 in the bore retains the whole charge within the chamber.

Figure 14:
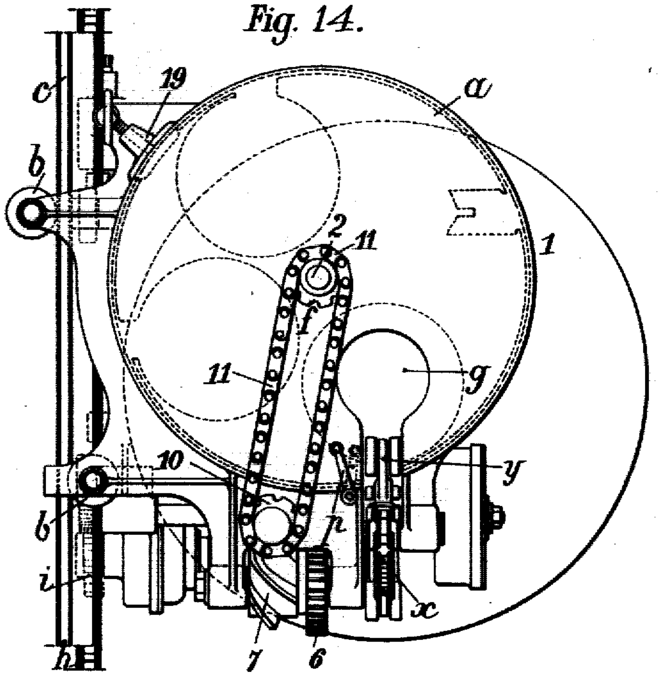
Figure 15:
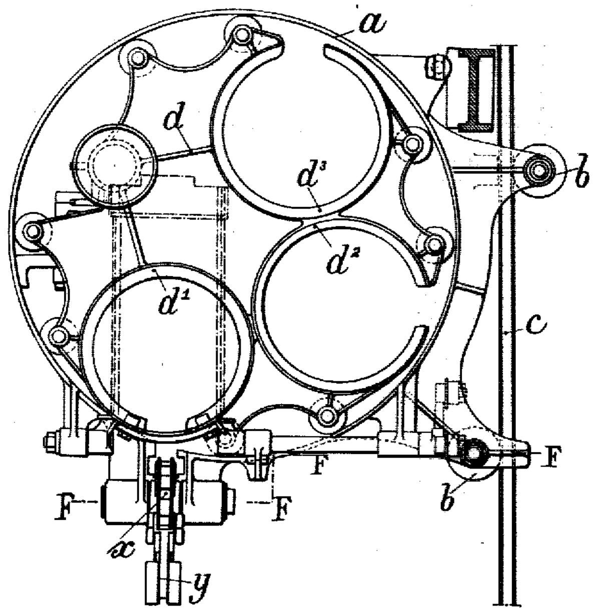
Figure 16:
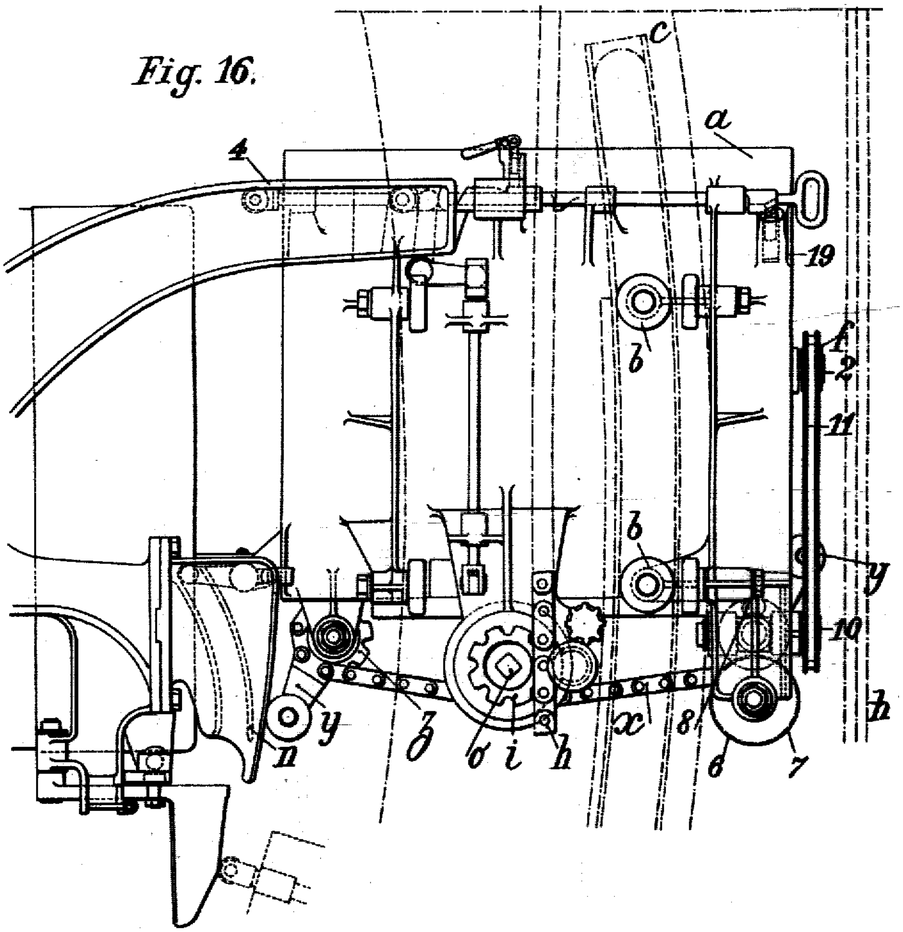
Figure 17:
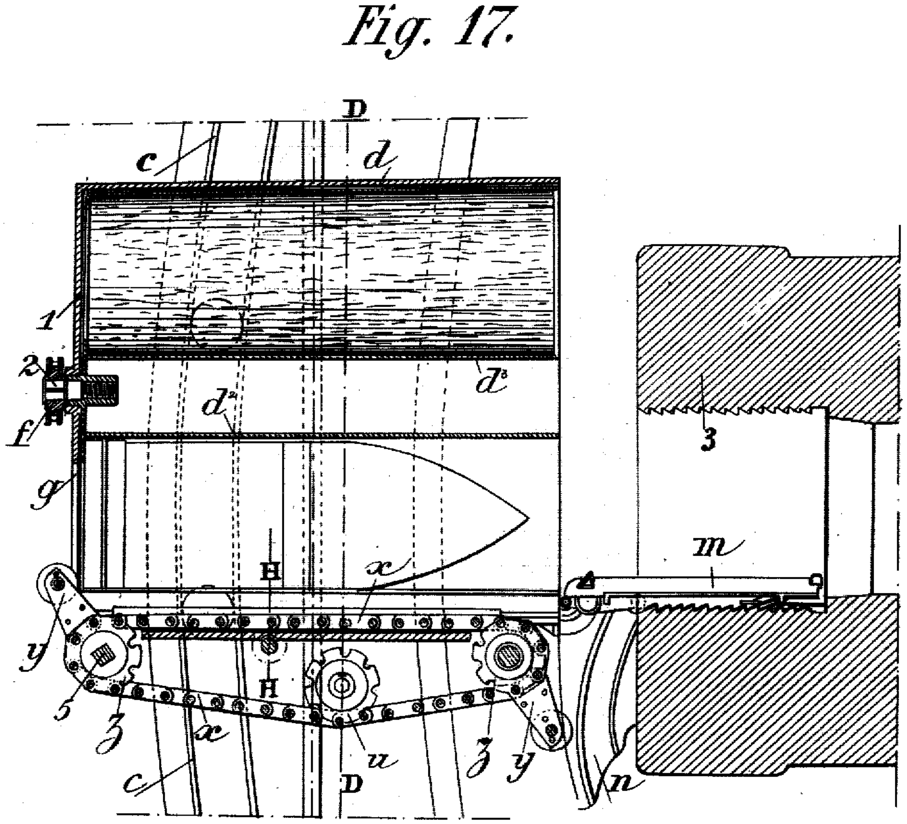
Figure 18:
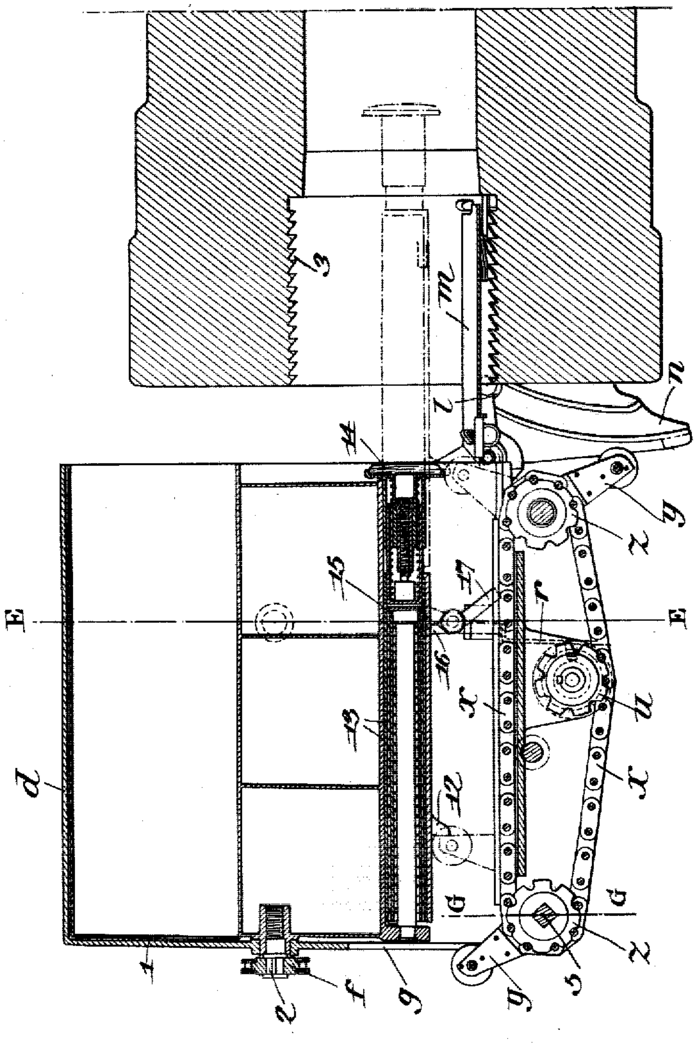
Figure 19:
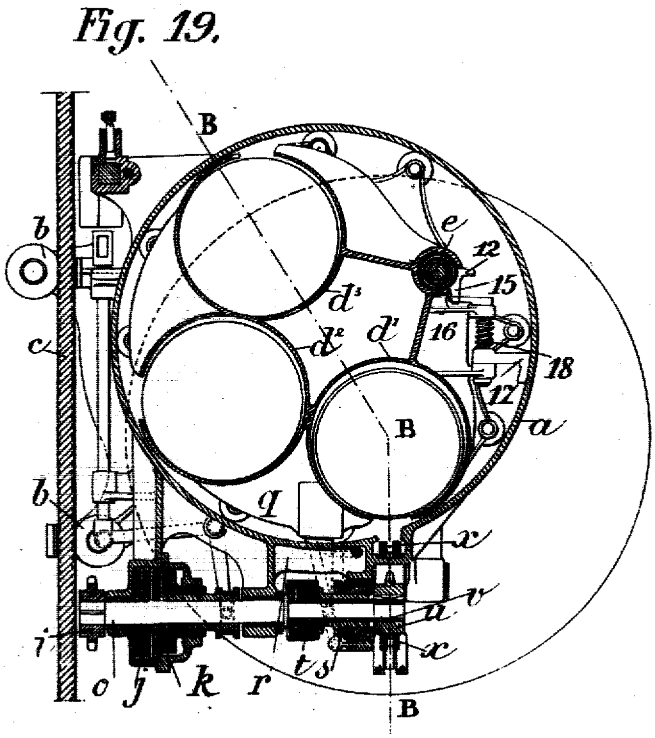
Figure 20:
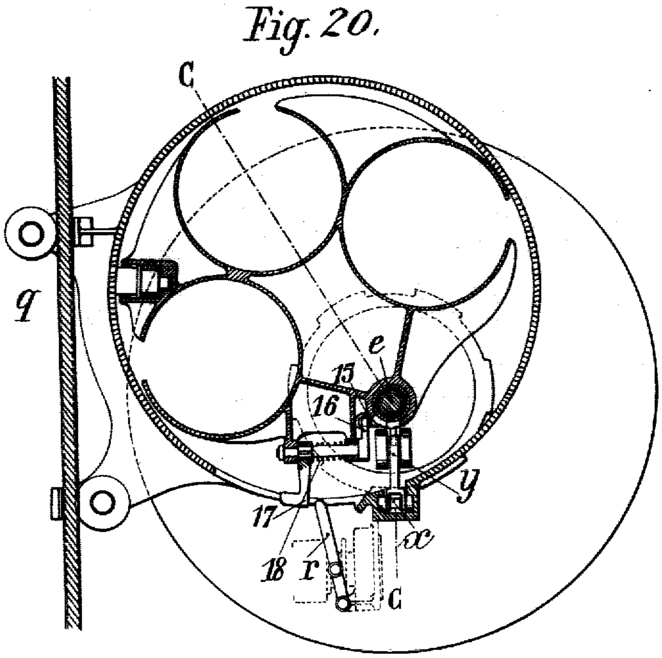
Figure 23:
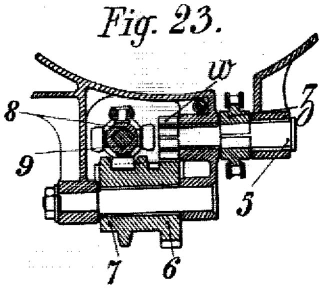
Figure 25:
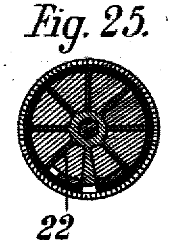
Figure 24:
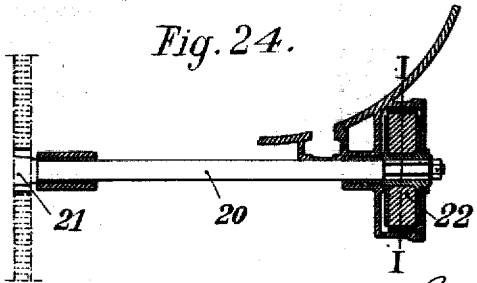
Figure 21:
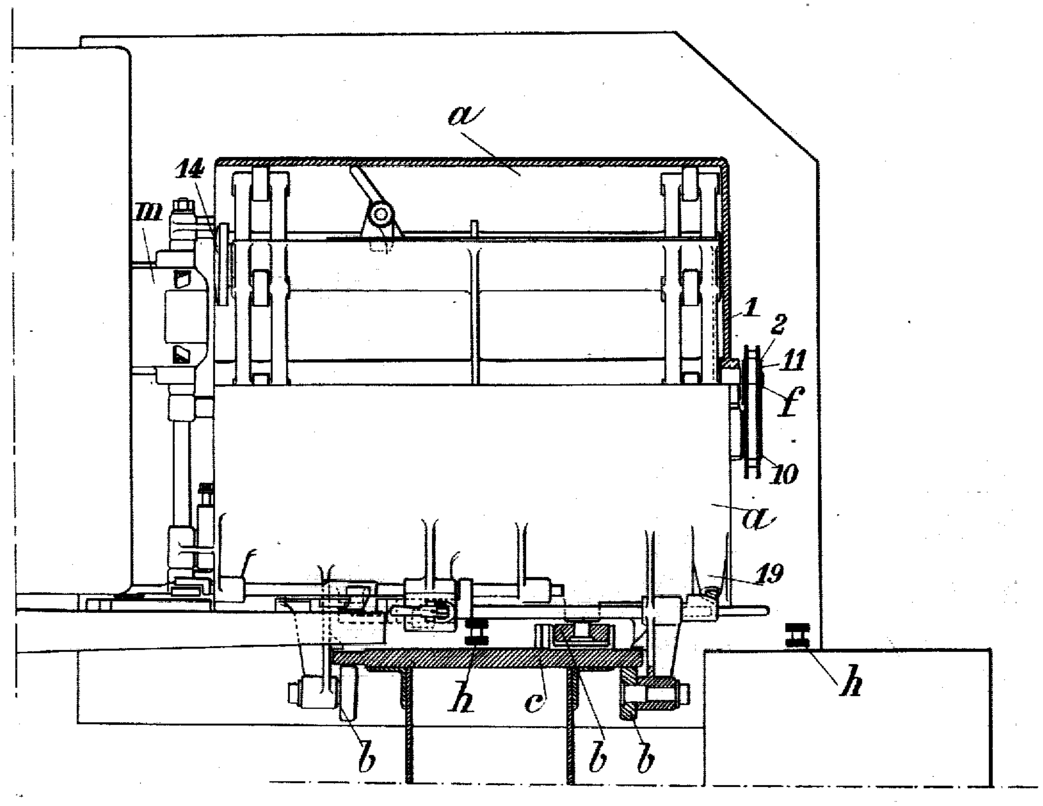
Figure 22:
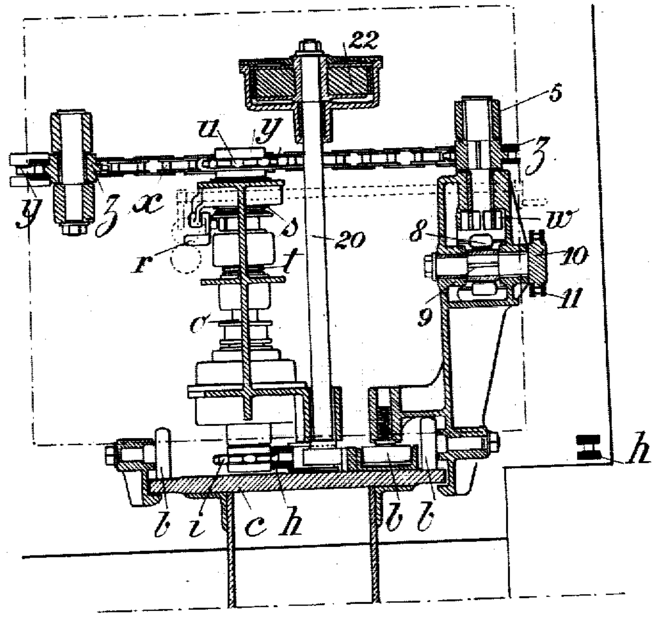

Figs. 14 to 25 represent a second constructional form in which a revolver-cage is combined with the "ramming" apparatus, properly so called, the whole being, as in the foregoing example, controlled by the same operating mechanism as the ammunition-hoist, which serves to raise the cage. Fig. 14 is a rear elevation showing the cage and the rammer. Fig. 15 is a corresponding front elevation. Fig. 16 is a side elevation. Fig. 17 is a longitudinal section on the line B B B of Fig. 19. Fig. 18 is a longitudinal section on the line C C C of Fig. 20. Fig. 19 is a cross-section on the line D D of Fig. 17. Fig. 20 is a cross-section on the line E E of Fig. 18. Fig. 21 is a sectional plan. Fig. 22 is a sectional plan on the line F F F F of Fig. 15. Fig. 23 is a cross-section on the line G G of Fig. 18. Fig. 24 is a cross-section on the line H H of Fig. 17. Fig. 25 is a cross-section on the line I I of Fig. 24. These two last figures represent the details of the regulator for the descent of the cage.

The aforesaid revolver-cage comprises the following apparatus—that is to say, a strongly built casing $a$, carrying rollers $b$ for keeping the cage upon the guide $c$. The revolving cylinder or revolver $d$, Fig. 19, has three boxes or compartments $d'$, $d^2$, and $d^3$, one of which, $d'$, serves for the reception of the projectile, while the two others, having a slightly greater diameter, are intended to contain the powder charges or cartridges. This revolver also carries in the position which might be occupied by a forth compartment a rammer $e$ and at its lower part the automatic operating mechanism for the continuous ramming or forcing forward of the revolver and the rammer.

The casing or frame a is of cylindrical form in order to contain and internally guide the revolver. It is entirely open forward and closed at the rear, as shown at 1. This closed end carries at its center an axis 2, upon which is mounted the chain-pinion f for operating the revolver. It is provided at its lower part with an aperture g, Fig. 14, serving for the passage of the continuous charging appliance and, if desired, for directly ramming in the ammunition. This aperture coincides with the axis of the bore when the cage is in the loading position. The casing carries all the supports necessary for its guidance and for the support of the mechanism and for the "ramming" apparatus, properly so called. At its forward end is mounted a loading-plate m, which is automatically operated.

The ascent of the cage is effected, as in the preceding example, by means of an endless chain h, Fig. 14, to which a continuous movement is imparted. This chain is, as in the first example, arranged for this purpose relatively to the fixed guides of the cage. The cage is therefore moved by the chain h, when the pinion i, Fig. 19, upon the shaft o is locked, by means of a washer friction device j, when the same is subjected to the full pressure of the springs k. The cage, as in the foregoing example, is stopped automatically, either beneath the gun, if the latter is not in battery and the breech entirely open, or behind the gun if the loading arrangements have been properly made. Toward the end of the ascending movement of the cage a roller l of the loading-plate m enters a groove n, Figs. 17 and 18, which automatically causes the depression of this plate into the breech-aperture 3 and keeps it there.

The cage being then stopped and hooked to the arm 4, carried by the gun-cradle, the pinion i is released and rotates freely upon its shaft o. By acting, as in the first example, upon the hand-lever p to move it into the dotted-line position p' the shaft 23 is rotated and with it a lever 24, keyed thereto, Figs. 14, 19, and 22. Lever 24 then depresses bolt g into its recess, releasing lever r, which then takes position r' under the action of springs s. These springs in extending exert their influence upon the friction device t, thereby connecting the rotating shaft o with the pinion u of the continuous rammer mechanism by the agency of the sleeve v. It will be obvious that the system o v is substantially equivalent to the divided shaft of the previously-described example. The pinion u drives the small endless chain x, carried by the cage. One of the pushers y, Figs. 17 and 18, fixed upon this chain, immediately forces the projectile into the bore, while the other arm takes the place of the first.

The small endless chain x is guided in its movement by two toothed pulleys z. Upon the shaft 5 of the rear pulley z, Figs. 22 and 23, is keyed a gear-wheel w, which, by means of a spur-wheel 6, operates a cam 7, Figs. 14 and 23, in which are formed circular and helicoidal grooves. In these grooves is always engaged one of the rollers of the wheel 8, the shaft 9 of which is parallel with that of the revolver. Upon this shaft outside the casing a is mounted a wheel 10, which a chain 11 connects with the wheel f, keyed upon the shaft of the revolver. Throughout the entire duration of the ramming of the projectile, so long as one of the arms y is situated within the revolver, the latter is locked by the wheel 8, one of the rollers of which is in engagement with the circular part of the cam 7. As soon as one of the arms y leaves the revolver and before the other is engaged therein the helicoidal portion of the cam 7 comes into action and effects a quarter-revolution of the revolver, thus presenting a cartridge to the charge-chamber of the gun. This cartridge is introduced therein in the same manner as the projectile by one of the arms y pushing it forward and in front of it the projectile. After the first cartridge has been forced into the chamber the same automatic movements are repeated, so as to cause the rotation of the revolver and the ramming of the second cartridge. The latter having been forced in the revolver effects a third quarter-revolution, so as to present the rammer o opposite the chamber. One of the arms y then acts upon a tappet 12 of the rammer, Figs. 18 and 19, which forces the whole charge forward in the gun with the projectile in its proper position.

When the arm y leaves the rammer, the latter is withdrawn into the revolver by a spiral spring 13, which has been compressed during the forward movement of the rammer. The head of the latter is provided with a yielding buffer or cushion 14, serving to compensate for the differences in the length of the cartridges and to permit the escape of the arm y and of the tappet 12 by a slight excess of compression. In returning to its inoperative position the rammer acts, by means of a stop 15, Figs. 19 and 20, upon a double lever 16 17, which resumes its initial position, from which it had moved as soon as the rammer began to move under the action of a spring 18. The revolver is then able to effect its fourth quarter-revolution in order that the chambers for the projectile and the cartridges may be suitably adjusted for the reception of fresh ammunition. It will thus be seen that when the charging terminates the lever 17 is displaced to one side and escapes the lever r. As the cage continues turning the bolt q comes over the opening 26, Fig. 20, encounters lever r, which moves from position r' to position r, thereby disengaging the charging mechanism. The system has now returned to its original position. In case the rammer does not exactly resume its place the lever 17 will encounter the lever *r* at the commencement of the fourth rotation and will stop the movement of the revolver by releasing it, thus preventing injury to the rammer still engaged in the barrel. It will therefore be impossible to unhook the cage and return it for the reception of fresh ammunition, because the safety-latch 19, Figs. 14 and 21, carried by the revolver, does not coincide with its bolt. The rammer being thus returned into position it releases the lever *r*, the parts are reengaged, the revolver resumes its normal position, and the cage may be unhooked and returned to the magazine or shell room.

The descent of the cage takes place, as in the example first described, under the influence of gravity, acceleration being limited by means of a centrifugal governor of any suitable construction—such, for example, as that represented in Figs. 23 and 24. A shaft 20, carried by the cage, has at one extremity a pinion 21, which rolls upon the chain *h* and at its other extremity a centrifugal brake 22.

From the commencement of the descent of the cage the loading-plate is automatically lifted by the parts by which it has been depressed At the lower part of the travel of the cage the plate is again depressed by a groove provided for this purpose, which also acts upon the roller *l* of the plate. The ammunition having been introduced into the cage, the latter may be caused to again return to its position behind the gun by relocking the pinion *i*.

What I claim, and desire to secure by Letters Patent of the United States, is—

1. In apparatus for supplying ammunition to and loading guns mounted in turrets or the like, said apparatus being operated by a common driving mechanism, the combination of a cage furnished with a charging or loading apparatus and a divided shaft the extremities of which carry the two elements of a clutch, one part of the shaft also receiving the driver for the pusher-chain of the said loading apparatus while the other part of said shaft carries a pinion constantly in engagement with the chain of the charge-hoist, and a brake which is normally kept applied but which is automatically released by the contact with the gun or a fixed portion of the turret or mounting.

2. A hoisting-cage provided with a revolver or revolving cylinder having three or more receptacles or chambers for the projectile and the cartridges, this revolver being arranged to turn in the casing and being actuated by transmission-gear comprising a cam, pinion and chain connected to the endless pusher-chain of the continuous charging apparatus.

3. In combination, an ammunition-hoisting cage, a charging-plate, pivoted upon a shaft carrying a lever which is provided with a roller adapted to automatically engage with a cam of the gun or of the waiting tray for the automatic depression of the plate.

4. In combination, an ammunition-hoisting cage, a pivotally-supported charging-plate thereon and a tappet engaging an object in the path of the cage to automatically raise and lower said plate.

5. In an ammunition hoisting and loading device for guns, the combination of a hoisting-cage, a loading device for transferring the ammunition from the cage to the gun, a power device, and a connection operable at will to connect said power device to said cage or said loading device.

6. In ammunition hoisting and loading apparatus, the combination of an ammunition-hoisting cage, loading mechanism carried thereby, a two-section shaft on said cage, means for raising and lowering said cage in engagement with one of said shaft-sections, a brake normally applied to said section during movement of the cage, brake-release means in the path of said cage permitting rotation of said section when said brake is released, a clutch device normally restrained from action for connecting and disconnecting said shaft-sections, and clutch-operating means for throwing in and out of operation said loading mechanism.

7. In an ammunition hoisting and loading device for guns, the combination of a hoisting-cage having a revolving ammunition-carrier therein, a loading device for transferring the ammunition from the carrier to the gun, power mechanism in operative relation with said cage and loading device, and operative connections between said loading device and carrier whereby the latter is rotated by the movements of said loading device.

8. In an ammunition hoisting and loading device, the combination of an ammunition-hoisting cage, power mechanism for raising and lowering the same, a shaft on said cage taking power from said mechanism, loading mechanism on the cage having a clutch connection with said shaft and automatic clutch-operating means for throwing the loading mechanism in and out of connection with said shaft.

9. In an ammunition hoisting and loading device, the combination of an ammunition-hoisting cage, power mechanism for raising and lowering the same, a shaft on said cage for taking power from said mechanism, loading mechanism on the cage having a clutch connection with said shaft, a brake device normally holding said shaft from rotation, and automatic brake-release means for releasing said shaft to permit the same to transmit power to the loading mechanism when said clutch device is closed.

10. In an ammunition hoisting and loading device, the combination of a hoisting-cage, power mechanism for raising and lowering the same, a revoluble shaft on said cage engaging said power mechanism, a brake normally restraining said shaft from rotation and automatic brake-release means for releasing said shaft to stop the upward movement of said cage.

In testimony whereof I have signed this specification in the presence of two subscribing witnesses.

CHARLES PROSPER EUGÈNE SCHNEIDER

Witnesses:

EDMOND BLAISE,

JEAN GAMET.